(12) United States Patent
Kajiya et al.

(10) Patent No.: US 7,799,301 B2
(45) Date of Patent: Sep. 21, 2010

(54) CATHODE MATERIAL FOR LITHIUM SECONDARY BATTERY AND MANUFACTURING METHOD THEREOF

(75) Inventors: Yoshio Kajiya, Ibaraki (JP); Hiroshi Tasaki, Ibaraki (JP)

(73) Assignee: Nippon Mining & Metals Co., Ltd., Tokyo (JP)

( * ) Notice: Subject to any disclaimer, the term of this patent is extended or adjusted under 35 U.S.C. 154(b) by 765 days.

(21) Appl. No.: 11/718,021

(22) PCT Filed: Oct. 13, 2005

(86) PCT No.: PCT/JP2005/018843
§ 371 (c)(1), (2), (4) Date: Apr. 26, 2007

(87) PCT Pub. No.: WO2006/049001
PCT Pub. Date: May 11, 2006

(65) Prior Publication Data
US 2009/0121198 A1    May 14, 2009

(30) Foreign Application Priority Data
Nov. 2, 2004  (JP) .............................. 2004-318718

(51) Int. Cl.
*C01D 1/00* (2006.01)
(52) U.S. Cl. ........................ 423/265; 429/221; 429/223; 429/224; 252/519.14
(58) Field of Classification Search ................. 423/265; 429/221, 223, 224; 252/519.14
See application file for complete search history.

(56) References Cited

U.S. PATENT DOCUMENTS

| | | | |
|---|---|---|---|
| 6,497,854 B2 | 12/2002 | Kohiro et al. | |
| 6,677,082 B2 | 1/2004 | Thackeray et al. | |
| 6,811,923 B1 | 11/2004 | Sakai et al. | |
| 6,964,828 B2 | 11/2005 | Lu et al. | |
| 7,078,128 B2 | 7/2006 | Lu et al. | |
| 7,288,242 B2 | 10/2007 | Tasaki et al. | |
| 7,648,693 B2 * | 1/2010 | Paulsen et al. | ........... 423/594.4 |
| 2002/0150820 A1 | 10/2002 | Kanai et al. | |
| 2004/0241084 A1 | 12/2004 | Kajiya et al. | |
| 2005/0265909 A1 | 12/2005 | Kajiya et al. | |
| 2006/0121350 A1 | 6/2006 | Kajiya et al. | |
| 2009/0166187 A1 | 7/2009 | Nagase et al. | |
| 2009/0200508 A1 | 8/2009 | Nagase et al. | |

OTHER PUBLICATIONS

One Page English Language Abstract of JP 2002-304993 A, Oct. 18, 2002.
One Page English Language Abstract of JP 2003-059490 A, Feb. 28, 2003.
One Page English Language Abstract of JP 2003-217580 A, Jul. 31, 2003.
Co-pending, unpublished U.S. Appl. No. 12/297,320.
Co-pending, unpublished U.S. Appl. No. 12/159,701.
ESP@CENET Database, English Abstract of JP 1-294364, Nov. 28, 1989.
ESP@CENET Database, English Abstract of JP 10-340726, Dec. 22, 1998.
ESP@CENET Database, English Abstract of JP 10-112306, Apr. 28, 1998.
ESP@CENET Database, English Abstract of JP 11-345615, Dec. 14, 1999.
ESP@CENET Database, English Abstract of JP 11-307094, Nov. 5, 1999.

* cited by examiner

*Primary Examiner*—Steven Bos
(74) *Attorney, Agent, or Firm*—Howson & Howson LLP

(57) ABSTRACT

Provided is a cathode material for a lithium secondary battery composed of an aggregate of Li-A-O composite oxide particles (wherein A represents one or more metal elements selected from Mn, Fe, Co and Ni), wherein the lithium composite oxide contains 20 to 100 ppm (by mass) of P, and the total content of impurity elements excluding essential components is 2000 ppm or less. Also provided is a manufacturing method of such a cathode material for a lithium secondary battery including the steps of suspending lithium carbonate in water and thereafter introducing a metallic salt solution of one or more metal elements selected from Mn, Fe, Co and Ni in the lithium carbonate suspension, adding a small amount of phosphoric acid so that the P content in the Li-A-O composite oxide particles will be 20 to 100 ppm (by mass), and forming an aggregate of Li-A-O composite oxide particles containing 20 to 100 ppm (by mass) of P by filtering, cleansing, drying and thereafter oxidizing the obtained carbonate. This cathode material for a lithium secondary battery and its manufacturing method realize improved sinterability and battery characteristics.

7 Claims, No Drawings

CATHODE MATERIAL FOR LITHIUM SECONDARY BATTERY AND MANUFACTURING METHOD THEREOF

BACKGROUND OF THE INVENTION

The present invention relates to a cathode material for a lithium secondary battery having superior sinterability and capable of exhibiting sufficient battery characteristics, and to the manufacturing method thereof.

In recent years, there is a rapidly growing demand for a non-aqueous system lithium secondary battery as a high energy density battery. This lithium secondary battery is configured from three fundamental components; namely, a cathode, an anode, and a separator retaining an electrolyte interposed between these electrodes.

As the cathode and anode, a slurry obtained by mixing and dispersing active materials, conductive materials, bonding materials and plasticizing agents (where appropriate) in a dispersion medium is used by being supported by a collector such as a metallic foil or a metallic mesh.

Among the above, as the cathode active material, a composite oxide of lithium and transition metal, in particular, cobalt composite oxide, nickel composite oxide, and manganese composite oxide are typical.

These lithium composite oxides are generally synthesized by mixing the compound of the main element (carbonate or oxide of Mn, Fe, Co, Ni and the like) and the lithium compound (lithium carbonate and the like) at a prescribed ratio, and subjecting this to heat treatment (oxidation treatment) (refer to Patent Document 1 and Patent Document 2).

Nevertheless, since these lithium composite oxides contain large amounts of impurity elements such as Na and S that inevitably get mixed in during the manufacturing process, such impurity elements would affect the sinterability and stability of composition and cause the deterioration in battery characteristics (rate characteristics).

In light of the above, the present inventors introduced chloride of one or more metal elements selected from Mn, Co and Ni in a lithium carbonate suspension in order to obtain a composite oxide containing only small amounts of Na and S (100 ppm (by mass) or less), and thereby proposed a lithium secondary battery material having a high tap density for obtaining fine powder and which stably yields superior battery characteristics (refer to Patent Document 3).

Although this lithium secondary battery material yields superior characteristics in comparison to the foregoing conventional art, there was still room for improvement regarding sinterability and battery characteristics.

[Patent Document 1] Japanese Patent Laid-Open Publication No. H1-294364

[Patent Document 2] Japanese Patent Laid-Open Publication No. H1-307094

[Patent Document 3] WO200316416 (Patent Application No. 2003-1955)

SUMMARY OF THE INVENTION

In light of the above, an object of the present invention is to introduce chloride of one or more metal elements selected from Mn, Co, Fe, and Ni in a lithium carbonate suspension in order to obtain a composite oxide containing only small amounts of Na and S (100 ppm (by mass) or less), and thereby obtain a cathode material for a lithium secondary battery and its manufacturing method which realize improved sinterability and battery characteristics.

In order to achieve the foregoing object, the present invention provides:

1) A cathode material for a lithium secondary battery composed of an aggregate of Li-A-O composite oxide particles (wherein A represents one or more metal elements selected from Mn, Fe, Co and Ni), wherein the lithium composite oxide contains 20 to 100 ppm (by mass) of P, and the total content of impurity elements excluding essential components is 2000 ppm or less;

2) The cathode material for a lithium secondary battery according to paragraph 1) above, wherein the total content of impurity elements excluding essential components is 2000 ppm or less, the total of group 1 elements of the periodic table is 300 ppm (by mass) or less, the total of group 2 elements of the periodic table is 600 ppm (by mass) or less, the total of transition metals and group 12 elements of the periodic table excluding essential components is 200 ppm (by mass) or less, the total of group 13 elements of the periodic table is 100 ppm (by mass) or less, the total of group 14 elements of the periodic table is 300 ppm (by mass) or less, and the total of group 15 elements of the periodic table is 200 ppm (by mass) or less;

3) A manufacturing method of a cathode material for a lithium secondary battery including the steps of suspending lithium carbonate in water and thereafter introducing a metallic salt solution of one or more metal elements selected from Mn, Fe, Co and Ni in the lithium carbonate suspension, adding a small amount of phosphoric acid so that the P content in the Li-A-O composite oxide particles will be 20 to 100 ppm (by mass), and forming an aggregate of Li-A-O composite oxide particles containing 20 to 100 ppm (by mass) of P by filtering, cleansing, drying and thereafter oxidizing the obtained carbonate;

4) The manufacturing method of a cathode material for a lithium secondary battery according to paragraph 3) above, wherein the total content of impurity elements excluding essential components is 2000 ppm or less;

5) The manufacturing method of a cathode material for a lithium secondary battery according to paragraph 3) above, wherein the total content of impurity elements excluding essential components is 2000 ppm or less, the total of group 1 elements of the periodic table is 300 ppm (by mass) or less, the total of group 2 elements of the periodic table is 600 ppm (by mass) or less, the total of transition metals and group 12 elements of the periodic table excluding essential components is 200 ppm (by mass) or less, the total of group 13 elements of the periodic table is 100 ppm (by mass) or less, the total of group 14 elements of the periodic table is 300 ppm (by mass) or less, and the total of group 15 elements of the periodic table is 200 ppm (by mass) or less; and 6) The manufacturing method of a cathode material for a lithium secondary battery according to paragraph 4) or paragraph 5) above, wherein a metallic salt solution of one or more metal elements selected from Mn, Fe, Co and Ni is a chloride solution or a sulfate solution thereof.

The cathode material for a lithium secondary battery and its manufacturing method according to the present invention yield a superior effect of improving the sinterability of Li-A-O composite oxide particles by introducing a metallic salt solution of one or more metal elements selected from Mn, Fe, Co and Ni in the lithium carbonate suspension and adding trace components of P, and further improving the battery characteristics with the obtained cathode material for a lithium secondary battery.

DETAILED DESCRIPTION OF THE INVENTION

The cathode material for a lithium secondary battery of the present invention is composed of an aggregate of Li-A-O composite oxide particles (wherein A represents one or more metal elements selected from Mn, Fe, Co and Ni). In addition, a significant characteristic of the present invention is that the lithium composite oxide contains 20 to 100 ppm (by mass) of P.

Since P (phosphorus) will be subject to a liquid phase at a temperature in the vicinity of 600 to 900° C. under the existence of transition metal oxide and lithium oxide, it will yield favorable sinterability, and the ameliorating effect of this sinterability will also affect the battery characteristics.

If the P content in the lithium composite oxide is less than 20 ppm (by mass), the ameliorating effect of sinterability cannot be acknowledged. Further, if P exceeds 100 ppm (by mass), it will become an unfavorable impurity, and inflict adverse effects on battery characteristics such as decrease in capacity and output characteristics. Therefore, it is desirable that the lithium composite oxide contains 20 to 100 ppm (by mass) of P.

With the cathode material for a lithium secondary battery according to the present invention, the total content of impurity elements excluding essential components (that is; Li-A-O (wherein A represents one or more metal elements selected from Mn, Fe, Co and Ni) and components to become the constituent features of P) is 2000 ppm or less. This is because the battery characteristics (cycle characteristics, I/O characteristics) will deteriorate if the total content of impurity elements exceeds 2000 ppm.

If the total content of impurity elements excluding essential components is 2000 ppm or less, this will not cause a particular problem since the individual impurity content will decrease comprehensively. Nevertheless, the following shows cases of limiting the individual impurities.

It is desirable that the total of group 1 elements of the periodic table (Na, K, Rb, Cs, Fr) is 300 ppm (by mass) or less, the total of group 2 elements of the periodic table (Be, Mg, Ca, Sr, Ba, Ra) is 600 ppm (by mass) or less, the total of transition metals and group 12 elements of the periodic table excluding essential components is 200 ppm (by mass) or less, the total of group 13 elements of the periodic table (B, Al, Ga, In, Tl) is 100 ppm (by mass) or less, the total of group 14 elements of the periodic table (Si, Ge, Sn, Pb) is 300 ppm (by mass) or less, and the total of group 15 elements of the periodic table (As, Sb, Bi) is 200 ppm (by mass) or less. Incidentally, P as a part of the group 15 elements is contained as an essential component in an amount of 20 to 100 ppm (by mass).

Since the excessive mixture of the foregoing group 1 and group 2 impurities will hinder the sintering of particles, the bonding between particles tends to weaken as a result of the mixture of such impurities, and there is also fear that this will result in defective coating due to the lack of tap density. Further, conductivity will become inferior because the bonding between particles is weak, and the battery characteristics (in particular, cycle characteristics and I/O characteristics) will become inferior.

Batteries will short-circuit easily with the excessive mixture of the foregoing transition metals and group 12 impurities, and there is fear that this will exert an adverse effect not only on the battery characteristics, but also on the safety of batteries.

Although the excessive mixture of group 13, group 14, and group 15 impurities will improve the sinterability, it will also cause the deterioration in capacity, and it is necessary to control the content to be less than the given quantity described above.

It is desirable that the foregoing metallic salt solution of one or more metal elements selected from Mn, Fe, Co and Ni is a chloride solution or a sulfate solution thereof. Thereby, it will be possible to prevent the mixture of Na and S as impurities, and more effectively inhibit the degradation of sinterability and adverse effects on the battery characteristics. Although there is concern for the mixture of S in the case of a sulfate solution, the mixture will not be of a level that causes the degradation of sinterability and adverse effects on the battery characteristics, and it has been confirmed that the amount is 100 ppm or less as prescribed in Patent Document 3.

The foregoing reduction of impurities will be attained by adopting a process capable of preventing the mixture of impurities during the manufacturing process in addition to the use of high purity materials as a matter of course. As described above, the process of the present invention is able to effectively inhibit the mixture of impurities and improve the degree of purity.

The manufacturing method of the cathode material for a lithium secondary battery according to the present invention adopts the steps of suspending lithium carbonate in water and thereafter introducing a metallic salt solution of one or more metal elements selected from Mn, Fe, Co and Ni in the lithium carbonate suspension.

As the metallic salt solution, it is desirable to use a chloride solution or a sulfate solution as described above. In addition, a small amount of phosphoric acid is added so that the P content in the Li-A-O composite oxide particles will be 20 to 100 ppm (by mass). This is a significant characteristic of the present invention.

Further, carbonate powder is obtained by filtering, cleansing, drying and thereafter oxidizing the obtained carbonate cake. By oxidizing the carbonate powder to obtain an aggregate of Li-A-O composite oxide particles containing 20 to 100 ppm (by mass) of P, the aggregate can be used as a cathode material of the lithium secondary battery. Thereby, it will be possible to improve the sinterability of the Li-A-O composite oxide particles, and the battery characteristics can be further improved with this cathode material for a lithium secondary battery.

Standard industrial methods will be sufficient for performing the foregoing filtering, cleansing, drying and oxidizing process. In other words, filtration under reduced pressure, filter press or the like can be used in the filtering and cleansing process, and a ventilation furnace, continuous furnace, spray drier or the like can be used in the drying and oxidizing process.

EXAMPLES

Examples and Comparative Examples of the present invention are now explained. Incidentally, these examples are merely illustrative, and the present invention shall in no way be limited thereby. In other words, the present invention shall include the various modes and modifications covered by the technical spirit of this invention.

(Case Where A in Li-A-O is a 1-Component System)

Examples 1-1 to 1-5, Examples 2-1 to 2-5, Examples 3-1 to 3-5, Comparative Examples 1-1 to 1-2, Comparative Examples 2-1 to 2-2, and Comparative Examples 3-1 to 3-2

1552 g of commercially available lithium carbonate was suspended in 3.2 L of water. 4.8 L of metallic salt solution was introduced into this suspension. The metallic salt solution were adjusted as shown in Table 1 to Table 3 so that the number of moles of all metals will be 14 moles by using the respective chlorides. Further, an adequate amount of phosphoric acid was added to this metallic salt solution, and the phosphorus (P) content was changed as shown in Table 1 to Table 3.

After preparing the carbonate, this was filtered, cleansed and dried to obtain 2160 g of carbonate. Chemical composition analysis was performed to the dried carbonate to check the molar ratio of Li and all metals, and Li/all metals (molar ratio) was 1.00.

Subsequently, the foregoing dried carbonate was oxidized in a continuous furnace. The oxidation conditions were retention for 5 hours at a temperature of 950° C. The obtained material had an average grain size of approximately 6 µm, and it was confirmed from the chemical composition analysis that the result was $LiCoO_2$ (Table 1), $LiNiO_2$ (Table 2), and $LiMn_2O_4$ (Table 3). Further, XRD was performed to confirm that $LiCoO_2$ and $LiNiO_2$ are of a layer structure, and $LiMn_2O_4$ is of a spinel structure.

The impurity content of each element was measured with GD-MS, and it was confirmed that the total impurity content is 2000 ppm or less in all cases.

This material was used as a cathode material to prepare an electrode film, and the battery characteristics were checked. The electrode film was prepared at a ratio of active material 85%, binder 8%, and conductive material 7% as a result of being kneaded with NMP as the solvent and applied to the Al foil, dried, and thereafter pressed. Moreover, a 2032-type coin cell for evaluation with Li as the counter electrode was prepared, and electrolyte obtained by dissolving 1M-LiPF6 to EC-DMC (1:1) was used to evaluate the initial capacity obtained with a 4.3V charging voltage and the capacity retention after 20 cycles at 25° C.

The foregoing results are shown in Table 1 to Table 3. As shown in Table 1 to Table 3, Examples 1-1 to 3-5 of the present invention attained results of all having favorable sinterability, high initial capacity, and extremely high capacity retention after 20 cycles at 25° C. Contrarily, when the P content was too low or too high in Comparative Examples 1-1 to 3-2, the results showed inferior sinterability, and low capacity retention after 20 cycles at 25° C.

Accordingly, it is evident that the addition of an adequate amount of P in the present component system is effective in improving the sinterability and battery characteristics.

TABLE 1

| No | P Content (ppm) | Sinterability | Initial Capacity (mAh/g) | Capacity Retention (%) after 20 Cycles at 25° C. |
|---|---|---|---|---|
| Example 1-1 | 25 | Favorable | 152 | 98 |
| Example 1-2 | 30 | Favorable | 152 | 98 |

TABLE 1-continued

| No | P Content (ppm) | Sinterability | Initial Capacity (mAh/g) | Capacity Retention (%) after 20 Cycles at 25° C. |
|---|---|---|---|---|
| Example 1-3 | 50 | Favorable | 153 | 99 |
| Example 1-4 | 70 | Favorable | 152 | 98 |
| Example 1-5 | 95 | Favorable | 152 | 98 |
| Comparative Example 1-1 | 5 | Somewhat Favorable | 150 | 97 |
| Comparative Example 1-2 | 120 | Defective | 148 | 96 |

TABLE 2

| No | P Content (ppm) | Sinterability | Initial Capacity (mAh/g) | Capacity Retention (%) after 20 Cycles at 25° C. |
|---|---|---|---|---|
| Example 2-1 | 25 | Favorable | 200 | 94 |
| Example 2-2 | 30 | Favorable | 200 | 94 |
| Example 2-3 | 50 | Favorable | 200 | 96 |
| Example 2-4 | 70 | Favorable | 200 | 95 |
| Example 2-5 | 95 | Favorable | 200 | 94 |
| Comparative Example 2-1 | 5 | Somewhat Favorable | 198 | 92 |
| Comparative Example 2-2 | 120 | Defective | 195 | 90 |

TABLE 3

| No | P Content (ppm) | Sinterability | Initial Capacity (mAh/g) | Capacity Retention (%) after 20 Cycles at 25° C. |
|---|---|---|---|---|
| Example 3-1 | 25 | Favorable | 100 | 90 |
| Example 3-2 | 30 | Favorable | 100 | 90 |
| Example 3-3 | 50 | Favorable | 102 | 92 |
| Example 3-4 | 70 | Favorable | 102 | 92 |
| Example 3-5 | 95 | Favorable | 100 | 90 |
| Comparative Example 3-1 | 5 | Somewhat Favorable | 100 | 88 |
| Comparative Example 3-2 | 120 | Defective | 98 | 88 |

(Case Where A in Li-A-O is a 2-Component System)

Examples 4-1 to 4-5, Examples 5-1 to 5-5, Examples 6-1 to 6-5, Examples 7-1 to 7-5, Examples 8-1 to 8-5, Examples 9-1 to 9-5, Comparative Examples 4-1 to 4-2, Comparative Examples 5-1 to 5-2, Comparative Examples 6-1 to 6-2, Comparative Examples 7-1 to 7-2, Comparative Examples 8-1 to 8-2, and Comparative Examples 9-1 to 9-2

According to similar methods, the 2-component system was examined.

The results are respectively shown in Table 4 ($LiNi_{1/2}Mn_{1/2}O_2$), Table 5 ($LiNi_{0.8}Co_{0.2}O_2$), Table 6 ($LiNi_{2/3}Fe_{1/3}O_2$), Table 7 ($LiCo_{0.9}Mn_{0.1}O_2$), Table 8 ($LiMn_{2/3}Fe_{1/3}O_2$), and Table 9 ($LiCo_{0.9}Fe_{0.1}O_2$).

As evident from the foregoing Tables, Examples 4-1 to 9-5 of the present invention attained results in all having favorable sinterability, high initial capacity, and extremely high capacity retention after 20 cycles at 25° C. Contrarily, when the P content was too low or too high in Comparative Examples 4-1 to 9-2, the results showed inferior sinterability, and low capacity retention after 20 cycles at 25° C.

Accordingly, it is evident that the addition of an adequate amount of P in the present component system is also effective in improving the sinterability and battery characteristics.

TABLE 4

| No | P Content (ppm) | Sinterability | Initial Capacity (mAh/g) | Capacity Retention (%) after 20 Cycles at 25° C. |
|---|---|---|---|---|
| Example 4-1 | 25 | Favorable | 145 | 92 |
| Example 4-2 | 30 | Favorable | 145 | 92 |
| Example 4-3 | 50 | Favorable | 146 | 93 |
| Example 4-4 | 70 | Favorable | 146 | 92 |
| Example 4-5 | 95 | Favorable | 145 | 92 |
| Comparative Example 4-1 | 5 | Somewhat Favorable | 142 | 90 |
| Comparative Example 4-2 | 120 | Defective | 140 | 88 |

TABLE 5

| No | P Content (ppm) | Sinterability | Initial Capacity (mAh/g) | Capacity Retention (%) after 20 Cycles at 25° C. |
|---|---|---|---|---|
| Example 5-1 | 25 | Favorable | 180 | 93 |
| Example 5-2 | 30 | Favorable | 180 | 93 |
| Example 5-3 | 50 | Favorable | 181 | 94 |
| Example 5-4 | 70 | Favorable | 182 | 94 |
| Example 5-5 | 95 | Favorable | 180 | 93 |
| Comparative Example 5-1 | 5 | Somewhat Favorable | 178 | 92 |
| Comparative Example 5-2 | 120 | Defective | 178 | 88 |

TABLE 6

| No | P Content (ppm) | Sinterability | Initial Capacity (mAh/g) | Capacity Retention (%) after 20 Cycles at 25° C. |
|---|---|---|---|---|
| Example 6-1 | 25 | Favorable | 130 | 92 |
| Example 6-2 | 30 | Favorable | 130 | 92 |
| Example 6-3 | 50 | Favorable | 132 | 93 |
| Example 6-4 | 70 | Favorable | 132 | 93 |
| Example 6-5 | 95 | Favorable | 130 | 92 |
| Comparative Example 6-1 | 5 | Somewhat Favorable | 128 | 88 |
| Comparative Example 6-2 | 120 | Defective | 128 | 86 |

TABLE 7

| No | P Content (ppm) | Sinterability | Initial Capacity (mAh/g) | Capacity Retention (%) after 20 Cycles at 25° C. |
|---|---|---|---|---|
| Example 7-1 | 25 | Favorable | 148 | 95 |
| Example 7-2 | 30 | Favorable | 148 | 95 |
| Example 7-3 | 50 | Favorable | 149 | 96 |
| Example 7-4 | 70 | Favorable | 148 | 95 |
| Example 7-5 | 95 | Favorable | 148 | 94 |
| Comparative Example 7-1 | 5 | Somewhat Favorable | 146 | 92 |
| Comparative Example 7-2 | 120 | Defective | 142 | 85 |

TABLE 8

| No | P Content (ppm) | Sinterability | Initial Capacity (mAh/g) | Capacity Retention (%) after 20 Cycles at 25° C. |
|---|---|---|---|---|
| Example 8-1 | 25 | Favorable | 96 | 90 |
| Example 8-2 | 30 | Favorable | 96 | 90 |
| Example 8-3 | 50 | Favorable | 97 | 91 |
| Example 8-4 | 70 | Favorable | 97 | 91 |
| Example 8-5 | 95 | Favorable | 96 | 90 |
| Comparative Example 8-1 | 5 | Somewhat Favorable | 92 | 88 |
| Comparative Example 8-2 | 120 | Defective | 88 | 85 |

TABLE 9

| No | P Content (ppm) | Sinterability | Initial Capacity (mAh/g) | Capacity Retention (%) after 20 Cycles at 25° C. |
|---|---|---|---|---|
| Example 9-1 | 25 | Favorable | 146 | 93 |
| Example 9-2 | 30 | Favorable | 146 | 93 |
| Example 9-3 | 50 | Favorable | 147 | 94 |
| Example 9-4 | 70 | Favorable | 147 | 94 |
| Example 9-5 | 95 | Favorable | 146 | 93 |
| Comparative Example 9-1 | 5 | Somewhat Favorable | 144 | 92 |
| Comparative Example 9-2 | 120 | Defective | 144 | 90 |

(Case Where A in Li-A-O is a 3-Component System)

Examples 10-1 to 10-5, Examples 11-1 to 11-5, Examples 12-1 to 12-5, Examples 13-1 to 13-5, Examples 14-1 to 14-5, Comparative Examples 10-1 to 10-2, Comparative Examples 11-1 to 11-2, Comparative Examples 12-1 to 12-2, Comparative Examples 13-1 to 13-2, and Comparative Examples 14-1 to 14-2

According to similar methods, the 3-component system was examined.

The results are respectively shown in Table 10 ($LiNi_{1/3}Mn_{1/3}Co_{1/3}O_2$), Table 11 ($LiNi_{0.4}Mn_{0.4}Co_{0.2}O_2$), Table 12 ($LiNiO_{0.45}Mn_{0.45}Fe_{0.1}O_2$), Table 13 ($LiNi_{0.8}Co_{0.1}Fe_{0.1}O_2$), and Table 14 ($LiNi_{0.7}Co_{0.2}Fe_{0.1}O_2$).

As evident from the foregoing Tables, Examples 10-1 to 14-5 of the present invention attained results in all having favorable sinterability, high initial capacity, and extremely high capacity retention after 20 cycles at 25° C. Contrarily, when the P content was too low or too high in Comparative Example 10-1 to 14-2, the results showed inferior sinterability, and low capacity retention after 20 cycles at 25° C.

Accordingly, it is evident that the addition of an adequate amount of P in the present component system is also effective in improving the sinterability and battery characteristics.

TABLE 10

| No | P Content (ppm) | Sinterability | Initial Capacity (mAh/g) | Capacity Retention (%) after 20 Cycles at 25° C. |
|---|---|---|---|---|
| Example 10-1 | 25 | Favorable | 160 | 94 |
| Example 10-2 | 30 | Favorable | 160 | 95 |
| Example 10-3 | 50 | Favorable | 162 | 95 |
| Example 10-4 | 70 | Favorable | 161 | 95 |

TABLE 10-continued

| No | P Content (ppm) | Sinterability | Initial Capacity (mAh/g) | Capacity Retention (%) after 20 Cycles at 25° C. |
|---|---|---|---|---|
| Example 10-5 | 95 | Favorable | 160 | 94 |
| Comparative Example 10-1 | 5 | Somewhat Favorable | 160 | 92 |
| Comparative Example 10-2 | 120 | Defective | 150 | 90 |

TABLE 11

| No | P Content (ppm) | Sinterability | Initial Capacity (mAh/g) | Capacity Retention (%) after 20 Cycles at 25° C. |
|---|---|---|---|---|
| Example 11-1 | 25 | Favorable | 158 | 93 |
| Example 11-2 | 30 | Favorable | 158 | 93 |
| Example 11-3 | 50 | Favorable | 160 | 94 |
| Example 11-4 | 70 | Favorable | 160 | 94 |
| Example 11-5 | 95 | Favorable | 158 | 93 |
| Comparative Example 11-1 | 5 | Somewhat Favorable | 154 | 90 |
| Comparative Example 11-2 | 120 | Defective | 152 | 88 |

TABLE 12

| No | P Content (ppm) | Sinterability | Initial Capacity (mAh/g) | Capacity Retention (%) after 20 Cycles at 25° C. |
|---|---|---|---|---|
| Example 12-1 | 25 | Favorable | 154 | 90 |
| Example 12-2 | 30 | Favorable | 155 | 92 |
| Example 12-3 | 50 | Favorable | 155 | 92 |
| Example 12-4 | 70 | Favorable | 155 | 92 |
| Example 12-5 | 95 | Favorable | 154 | 90 |
| Comparative Example 12-1 | 5 | Somewhat Favorable | 150 | 85 |
| Comparative Example 12-2 | 120 | Defective | 140 | 84 |

TABLE 13

| No | P Content (ppm) | Sinterability | Initial Capacity (mAh/g) | Capacity Retention (%) after 20 Cycles at 25° C. |
|---|---|---|---|---|
| Example 13-1 | 25 | Favorable | 178 | 92 |
| Example 13-2 | 30 | Favorable | 178 | 92 |
| Example 13-3 | 50 | Favorable | 180 | 92 |
| Example 13-4 | 70 | Favorable | 180 | 91 |
| Example 13-5 | 95 | Favorable | 178 | 91 |
| Comparative Example 13-1 | 5 | Somewhat Favorable | 175 | 90 |
| Comparative Example 13-2 | 120 | Defective | 176 | 87 |

TABLE 14

| No | P Content (ppm) | Sinterability | Initial Capacity (mAh/g) | Capacity Retention (%) after 20 Cycles at 25° C. |
|---|---|---|---|---|
| Example 14-1 | 25 | Favorable | 158 | 93 |
| Example 14-2 | 30 | Favorable | 158 | 93 |
| Example 14-3 | 50 | Favorable | 160 | 94 |
| Example 14-4 | 70 | Favorable | 160 | 94 |
| Example 14-5 | 95 | Favorable | 157 | 93 |
| Comparative Example 14-1 | 5 | Somewhat Favorable | 155 | 92 |
| Comparative Example 14-2 | 120 | Defective | 154 | 90 |

(Case Where A in Li-A-O is a 4-Component System)

Examples 15-1 to 15-5 and Comparative Examples 15-1 to 15-2

According to similar methods, the 4-component system was examined.

The results are shown in Table 15 ($LiNi_{0.4}Mn_{0.4}Co_{0.1}Fe_{0.1}O_2$).

As evident from the foregoing Table, Examples 15-1 to 15-5 of the present invention attained results in all having favorable sinterability, high initial capacity, and extremely high capacity retention after 20 cycles at 25° C. Contrarily, when the P content was too low or too high in Comparative Example 15-1 to 15-2, the results showed inferior sinterability, and low capacity retention after 20 cycles at 25° C.

Accordingly, it is evident that the addition of an adequate amount of P in the present component system is also effective in improving the sinterability and battery characteristics.

TABLE 15

| No | P Content (ppm) | Sinterability | Initial Capacity (mAh/g) | Capacity Retention (%) after 20 Cycles at 25° C. |
|---|---|---|---|---|
| Example 15-1 | 25 | Favorable | 140 | 90 |
| Example 15-2 | 30 | Favorable | 140 | 90 |
| Example 15-3 | 50 | Favorable | 142 | 92 |
| Example 15-4 | 70 | Favorable | 142 | 92 |
| Example 15-5 | 95 | Favorable | 141 | 90 |
| Comparative Example 15-1 | 5 | Somewhat Favorable | 135 | 88 |
| Comparative Example 15-2 | 120 | Defective | 136 | 85 |

The cathode material for a lithium secondary battery according to the present invention is capable of improving the sinterability of Li-A-O composite oxide particles by introducing a metallic salt solution of one or more metal elements selected from Mn, Fe, Co and Ni in the lithium carbonate suspension and adding trace components of P. Since this cathode material for a lithium secondary battery yields a superior effect of being able to improve the battery characteristics, the present invention is useful as a cathode material for a lithium secondary battery.

The invention claimed is:

1. A cathode material for a lithium secondary battery composed of an aggregate of particles of a Li-A-O composite oxide, wherein A represents one or more metal elements selected from the group consisting of Mn, Fe, Co and Ni, wherein the Li-A-O composite oxide contains 20 to 100 ppm by mass of P, and the total content of impurity elements excluding essential components of Li, A, O and P is 2000 ppm or less.

2. The cathode material for a lithium secondary battery according to claim 1, wherein the total content of impurity elements excluding the essential components is 2000 ppm or less, the total of Na, K, Rb, Cs and Fr is 300 ppm by mass or less, the total of Be, Mg, Ca, Sr, Ba and Ra is 600 ppm by mass or less, the total of transition metals and group 12 elements of the periodic table of chemical elements excluding the essential components is 200 ppm by mass or less, the total of B, Al, Ga, In and Ti is 100 ppm by mass or less, the total of Si, Ge, Sn and Pb is 300 ppm by mass or less, and the total of As, Sb and Bi is 200 ppm by mass or less.

3. A manufacturing method of a cathode material for a lithium secondary battery including the steps of suspending lithium carbonate in water to form a suspension and thereafter introducing a metallic salt solution of one or more metal elements selected from the group consisting of Mn, Fe, Co and Ni and a small amount of phosphoric acid to the suspension, and, after said suspending and introducing steps, forming an aggregate of Li-A-O composite oxide particles containing 20 to 100 ppm by mass of P by filtering, cleansing, drying and thereafter oxidizing the suspension, wherein A represents one or more metal elements selected from the group consisting of Mn, Fe, Co and Ni.

4. The manufacturing method of a cathode material for a lithium secondary battery according to claim 3, wherein the total content of impurity elements excluding essential components of Li, A, O and P is 2000 ppm or less.

5. The manufacturing method of a cathode material for a lithium secondary battery according to claim 3, wherein the total content of impurity elements excluding the essential components is 2000 ppm or less, the total of Na, K, Rb, Cs and Fr is 300 ppm by mass or less, the total of Be, Mg, Ca, Sr, Ba and Ra is 600 ppm by mass or less, the total of transition metals and group 12 elements of the periodic table of chemical elements excluding the essential components is 200 ppm by mass or less, the total of B, Al, Ga, In and Ti is 100 ppm by mass or less, the total of Si, Ge, Sn and Pb is 300 ppm by mass or less, and the total of As, Sb and Bi is 200 ppm by mass or less.

6. A manufacturing method of a cathode material for a lithium secondary battery according to claim 5, wherein the metallic salt solution of one or more metal elements selected from the group consisting of Mn, Fe, Co and Ni is a chloride solution or a sulfate solution thereof.

7. A manufacturing method of a cathode material for a lithium secondary battery according to claim 4, wherein the metallic salt solution of one or more metal elements selected from the group consisting of Mn, Fe, Co and Ni is a chloride solution or a sulfate solution thereof.

* * * * *

UNITED STATES PATENT AND TRADEMARK OFFICE
CERTIFICATE OF CORRECTION

| | | |
|---|---|---|
| PATENT NO. | : 7,799,301 B2 | Page 1 of 1 |
| APPLICATION NO. | : 11/718021 | |
| DATED | : September 21, 2010 | |
| INVENTOR(S) | : Yoshio Kajiya et al. | |

It is certified that error appears in the above-identified patent and that said Letters Patent is hereby corrected as shown below:

In the Specifications:
Column 1, line 54, -- No. H1-307094; -- should read -- No. H11-307094 --

Signed and Sealed this
Twenty-second Day of February, 2011

David J. Kappos
*Director of the United States Patent and Trademark Office*